(12) United States Patent
Ighofose et al.

(10) Patent No.: US 11,299,677 B2
(45) Date of Patent: Apr. 12, 2022

(54) PYROLYSIS REACTOR AND METHOD OF PYROLYZING BIOMASS WASTE RESIDUE

(71) Applicant: PYROGENESYS LIMITED, Birmingham (GB)

(72) Inventors: Simon Ighofose, Birmingham (GB); Muhammad Saghir, Birmingham (GB); Joseph Socci, Birmingham (GB); Joseph Enyinwa Eke, Birmingham (GB)

(73) Assignee: PYROGENESYS LIMITED, Birmingham (GB)

( * ) Notice: Subject to any disclaimer, the term of this patent is extended or adjusted under 35 U.S.C. 154(b) by 22 days.

(21) Appl. No.: 16/975,998

(22) PCT Filed: Nov. 27, 2018

(86) PCT No.: PCT/GB2018/053427
§ 371 (c)(1),
(2) Date: Aug. 26, 2020

(87) PCT Pub. No.: WO2019/102232
PCT Pub. Date: May 31, 2019

(65) Prior Publication Data
US 2021/0040392 A1    Feb. 11, 2021

(30) Foreign Application Priority Data
Nov. 27, 2017   (GB) ..................... 1719688

(51) Int. Cl.
*C10B 47/44* (2006.01)
*C10B 53/02* (2006.01)

(52) U.S. Cl.
CPC .............. *C10B 47/44* (2013.01); *C10B 53/02* (2013.01)

(58) Field of Classification Search
CPC ...................................... Y02E 50/10
(Continued)

(56) References Cited

U.S. PATENT DOCUMENTS

| 3,787,292 A | 1/1974 | Keappler |
| 4,250,158 A * | 2/1981 | Solbakken .............. C10B 53/07 423/449.6 |

(Continued)

FOREIGN PATENT DOCUMENTS

| CA | 2 303 795 | 9/2001 |
| CN | 201857370 | 6/2011 |

(Continued)

OTHER PUBLICATIONS

International Search Report for PCT/GB2018/053427 dated Jan. 30, 2019, 4 pages.

(Continued)

*Primary Examiner* — Nina Bhat
(74) *Attorney, Agent, or Firm* — Nixon & Vanderhye PC

(57) ABSTRACT

A pyrolysis reactor having an inlet for material and an outlet for products is provided. The reactor includes a screw for conveying biomass waste from the inlet to the outlet. The screw includes a shaft with a first end and a second end adjacent the outlet and a helical flight arranged about the shaft and extending between the first and second ends. The pitch of the flight alters between the first and second ends of the shaft. The screw has a heater extending from the first end to the second end.

18 Claims, 7 Drawing Sheets

(58) Field of Classification Search
USPC .......... 201/21, 32, 40; 202/86, 96, 118, 128, 202/131, 218, 230; 585/241
See application file for complete search history.

(56) References Cited

U.S. PATENT DOCUMENTS

| | | | | |
|---|---|---|---|---|
| 4,686,008 | A * | 8/1987 | Gibson | C10B 7/10 201/33 |
| 5,017,269 | A * | 5/1991 | Loomans | C10B 7/10 201/25 |
| 5,389,691 | A * | 2/1995 | Cha | C10G 1/02 521/41 |
| 6,221,329 | B1 * | 4/2001 | Faulkner | C09C 1/482 423/445 R |
| 8,177,412 | B2 * | 5/2012 | Murakami | B29C 48/57 366/75 |
| 8,647,586 | B2 * | 2/2014 | Shulenberger | C10B 53/02 422/200 |
| 9,005,402 | B2 * | 4/2015 | Del Monte | B01J 8/087 201/32 |
| 10,731,081 | B2 * | 8/2020 | Ullom | C10B 7/10 |
| 2006/0000701 | A1 | 1/2006 | Smith et al. | |
| 2006/0143977 | A1 * | 7/2006 | Meijer | B01F 7/086 44/629 |
| 2007/0209923 | A1 * | 9/2007 | Flottvik | C10B 7/10 202/118 |
| 2009/0007484 | A1 | 1/2009 | Smith | |
| 2010/0288618 | A1 * | 11/2010 | Feerer | F23G 5/46 202/118 |
| 2011/0114144 | A1 * | 5/2011 | Green | C10B 53/02 136/201 |
| 2013/0299333 | A1 * | 11/2013 | Tucker | C10B 7/10 202/113 |
| 2016/0017232 | A1 * | 1/2016 | Ullom | C10G 1/002 201/32 |
| 2017/0145314 | A1 * | 5/2017 | Parkinson | B65G 65/463 |
| 2020/0398475 | A1 * | 12/2020 | Oasmaa | B29C 48/681 |

FOREIGN PATENT DOCUMENTS

| | | |
|---|---|---|
| DE | 20 2013 101 154 | 4/2013 |
| EP | 1 405 895 | 4/2004 |
| EP | 2 233 547 | 9/2010 |
| GB | 2 029 355 | 3/1980 |
| JP | H09-291290 | 11/1997 |
| KR | 10-2014-0073922 | 6/2014 |
| WO | 2009/109337 | 9/2009 |
| WO | 2012/136344 | 10/2012 |
| WO | 2015/005807 | 1/2015 |

OTHER PUBLICATIONS

International Preliminary Report on Patentability and Written Opinion dated Jun. 2, 2020 in corresponding International Application No. PCT/GB2018/053427, 8 pages.

GB Search Report for GB 1719688.2 dated May 24, 2018, 5 pages.

Exam Report dated Nov. 28, 2021 in corresponding African Regional Intellectual Property Organization (ARIPO) Application No. AP/P/2020/012481, 4 pages.

* cited by examiner

PYROLYSIS REACTOR AND METHOD OF PYROLYZING BIOMASS WASTE RESIDUE

This application is the U.S. national phase of International Application No. PCT/GB2018/053427 filed Nov. 27, 2018 which designated the U.S. and claims priority to GB Patent Application No. 1719688.2 filed Nov. 27, 2017, the entire contents of each of which are hereby incorporated by reference.

TECHNICAL FIELD

This invention relates generally to pyrolysis. More specifically, although not exclusively, this invention relates to apparatus for and methods of pyrolysis.

BACKGROUND AND SUMMARY

Biomass waste residues may be converted into useful products by pyrolysis, gasification or combustion. Of these processes, pyrolysis advantageously can produce Biochar, Bio-oil and fuel gas, whilst gasification produces fuel gas and combustion generates heat.

Pyrolysis entails heating a substance (for example biomass waste residue) in an oxygen free environment (e.g. in a reactor) in order to thermally decompose that substance into relatively lower-molecular weight products. The substance may be moved within and/or through the oxygen free environment, e.g. the reactor, by an extruder screw.

It is particularly beneficial to generate relatively low-molecular weight non-condensable fuel gases, when pyrolyzing biomass waste residue. Pyrolysis is more efficient, and hence a greater concentration of desired products may be produced, at relatively higher temperatures. However, the use of relatively higher temperatures require reactors to be formed from more expensive materials and/or to have more expensive constructions.

It is a non-exclusive object of the invention to provide an improved extruder screw for a pyrolysis reactor and/or an improved pyrolysis reactor.

Accordingly, a first aspect of the invention provides an extruder screw for conveying biomass waste residue in a pyrolysis reactor, the extruder screw comprising a shaft with a first and a second end and a helical flight arranged about the shaft and extending between the first and second ends, wherein the pitch and/or the depth of the flight alters between the first and second ends of the shaft.

A further aspect of the invention provides a pyrolysis reactor having an inlet for material and an outlet for products, the reactor comprising a screw for conveying biomass waste from the inlet to the outlet, the screw comprising a shaft with a first end and a second end adjacent the outlet and a helical flight arranged about the shaft and extending between the first and second ends, wherein the pitch of the flight alters between the first and second ends of the shaft, the screw having a heater extending from the first end to the second end.

The invention thereby advantageously provides for more efficient transfer of heat to a substance conveyed along the screw e.g. extruder screw, in use. Altering the depth and pitch of the flight alters the volume between adjacent turns of the flight. Accordingly, the pressure of a substance conveyed along the extruder screw is relatively increased or reduced in proportion to the change in volume. Without wishing to be bound by any particular theory it is believed that selectively increasing the pressure of the substance at one or more location along the screw e.g. extruder screw, in use, enhances the efficiency of thermal energy transfer to the substance, thereby enhancing pyrolysis.

In general, all screws e.g. extruder screws comprise a shaft with a helical flight arranged about the shaft. There are a number of important geometric variables associated with extruder screws of this nature: (i) the pitch of flight; (ii) the depth of the flight (or the channel depth); (iii) the flight width; (iv) the flight clearance; (v) and the helix angle.

The pitch of flight is defined as the distance in an axial direction from the centre of a flight at it periphery to the centre of the next flight, i.e. the distance between each adjacent turn of the helical flight.

In an embodiment, the pitch of the screw may decrease within at least a portion of the screw by a fixed pitch-to-pitch amount. For example, if there are successive turns of the helical flight the pitch between the first and second turn may be different to the pitch between the second and third turn. The pitch may vary by a fixed amount (constant ratio) between successive turns. In one embodiment the distance between successive turns may be 0.995 of the preceding distance, for example the constant ratio may be from 0.850 to 0.999.

The depth of the flight (or the channel depth) is defined as th distance in a radial direction from the periphery of the flight to the root (i.e. the surface of the shaft).

The flight width is defined as the distance in an axial direction across the periphery of the flight.

Wherein the extruder screw is surrounded by a barrel or a housing, the flight clearance is defined as the distance, in a tangential direction, between the periphery of the flight, and the inner surface of the barrel or housing.

The helix angle is defined as the angle of the flight at its periphery relative to a plane perpendicular to the screw axis.

The values for the flight width and the flight clearance of the extruder screw of the present invention are constant along the entire length of the extruder screw, from the first end to the second end.

The first end may comprise an inlet end, e.g. and the second end may comprise an outlet end. The pitch of the flight (e.g. the pitch between adjacent turns of the flight) may decrease along at least part of the length of the shaft. For example, the pitch of the flight may decrease in the direction from the inlet end toward the outlet end, e.g. in a downstream direction, in use. The depth of the flight may decrease along at least part of the length of the shaft. For example, the depth of the flight may decrease in the direction from the inlet end toward the outlet end, e.g. in a downstream direction, in use.

The outer diameter of the flight may be at least substantially constant along the length of the shaft. For example, the outer diameter of each turn of the flight may be at least substantially the same along the flight. The helix angle of the flight may be at least substantially constant along the length of the flight. In embodiments, the helix angle may vary in correspondence to increase or decrease of the pitch along the length of the shaft.

The diameter of the shaft may vary along its length, e.g. between the first and second ends. For example, the diameter of the shaft may increase toward the outlet end, e.g. in a downstream direction, in use. The diameter of the shaft may change constantly and/or continuously along at least a portion fo its length, for example within the metering section, the transition section and/or the feed section.

The shaft may be configured or configurable to be heated, in use. The shaft may comprise thermally conductive material, for example the shaft may be at least partially formed from thermally conductive material. The shaft may comprise a recess, for example a central recess. The recess may extend along at least part of the length of the shaft. The recess may be configured to receive and/or retain a heating device or heating means. The extruder screw may comprise a heating device or means, for example adapted to heat the shaft, in use.

Advantageously, the heater may be rotatable with the shaft. In an embodiment the heater and shaft are mounted for rotation within the or a barrel or housing. The heater and shaft may be separably or jointly mounted for rotation. The heater and or shaft may be mounted for rotation at mounts. The mounts may be outboard of an inlet for material and an outlet for products.

The heater may comprise one or more of one or more hollow tubes, heat conductive rods, resistively heated elements and so on.

In an embodiment the one or more hollow tubes may receive heating fluid. The heating fluid may be arranged to contra-flow to the direction taken by material to be pyrolyzed.

The one or more hollow tubes may communicate with an inlet manifold and/or outlet manifold.

The extruder screw and/or the shaft may comprise a feed section, a transition section and/or a metering section. The feed section may be at and/or adjacent the inlet end of the extruder screw and/or the shaft. The metering section may be at and/or adjacent the outlet end of the extruder screw and/or the shaft. The transition section may be between the feed section and the metering section.

The pitch of the flight may be less in the metering section than in the feed section and/or in the transition section. The depth of the flight may be less in the metering section than in the feed section and/or in the transition section.

The outlet end of the extruder screw may be configured to separate the products of pyrolysis of a substance conveyed along the extruder screw, in use. The extruder screw and/or the shaft may further comprise an outlet section located in between the metering section and the outlet end. The shaft of the outlet section may have a reduced diameter, for example reduced with respect to the diameter of the shaft in the metering section. The pitch and/or the depth of the flight may be greater at the outlet section of the extruder screw than in the metering section. The shaft of the outlet section may further comprise a conical or tapered end, for example which may be co-axial with a longitudinal axis of the shaft.

One or more apertures may extend through the flight. Where plural apertures are provided they may be arranged at substantially equal distances from the outer surface of the shaft. Where plural apertures are provided they may be arranged evenly around the shaft. The flight in the metering section (e.g. at and/or adjacent the outlet end of the shaft) may comprise the one or more apertures. The flight in the feed section and/or the transition section may be free from (e.g. at least substantially free from) apertures.

The or each aperture may comprise a non-constant cross-sectional shape. For example, the or each aperture may comprise a first area on a first face of a turn of the flight and a second area on the second face (e.g. obverse face) of the turn of the flight. The first area may be less than the second area. The first face may be an upstream face, for example a face nearer to the inlet end of the shaft than the second face. The second face may be a downstream face. The or each aperture may taper from the first face to or toward the second face of the flight. The taper may increase in a direction from the inlet end toward the outlet end, for example in the downstream direction, in use.

The extruder screw may be configured or configurable to be rotated, in use. For example, the extruder screw may comprise an engagement member configured to allow engagement between the shaft and an actuator for rotating the shaft. The engagement member may extend from the inlet end of the shaft. The engagement member may comprise securement means for securing the shaft to an actuator or linking member such as a gear. The securement means may comprise a keyway and/or abutment and/or may comprise the shape of the engagement member.

A further aspect of the invention provides a pyrolysis reactor comprising an extruder screw as described herein.

The pyrolysis reactor may comprise a housing or barrel, for example having an inlet and an outlet. The inlet may be configured to allow the ingress of a substance (for example biomass) for pyrolysis, in use. The outlet may be configured to allow the egress of products of pyrolysis of a substance (e.g. biomass) within the housing or barrel, in use. The extruder screw may be arranged or arrangeable to convey, in use, a substance introduced at the inlet to or toward the outlet.

The housing or barrel may define a processing chamber therewith, for example an elongate processing chamber. The extruder screw may be arranged or arrangeable within the processing chamber, e.g. mounted or mountable within the processing chamber. The housing or barrel may comprise a housing wall or barrel wall, for example which may be configured to extend between the inlet and the outlet. The housing wall or barrel wall may surround the extruder screw, e.g. in use. The housing or barrel may be sized and/or shaped to closely surround the extruder screw, for example when arranged therewithin. An inner surface of the housing wall or barrel wall may be spaced from the outer edge of the flight of the extruder screw by a clearance distance. The clearance distance may be substantially constant along the length of the flight. The housing wall or barrel wall may comprise (e.g. be at least partially formed from) a thermally conductive material. The housing wall or barrel wall may be configured to transfer heat, in use, to a substance for processing introduced or located therewithin. The housing or barrel may comprise a furnace. The housing or barrel may have a generally tubular shape.

The outlet may comprise a lead-in portion. The lead-in portion may taper, for example in a direction from the inlet toward the outlet. The taper may narrow in the direction from the inlet toward the outlet. The outlet may be arranged substantially co-axially with the shaft of the extruder screw (where provided and where it is within the housing or barrel).

The outlet may comprise first and second outlets. The first outlet may be arranged or arrangeable, in use, such that vapour and/or gas products of pyrolysis can exit the housing or barrel therethrough. The second outlet may be arranged or arrangeable, in use, such that non-vapour and/or non-gaseous products (e.g. solid or liquid products) can exit the housing or barrel therethrough.

The pyrolysis reactor may comprise a heating device or means, for example configured or configurable to heat the housing wall or barrel wall (e.g. configured or configurable to transfer heat to an inner surface of the housing wall or barrel wall). The pyrolysis reactor may comprise a motor or other prime mover for rotating the extruder screw.

A yet further aspect of the invention provides a pyrolysis reactor for pyrolyzing biomass, the pyrolysis reactor comprising a conveying means or device and a housing or barrel having an inlet and an outlet, where the conveying means or device is arranged to move biomass introduced, in use, at the inlet toward the outlet and where the reactor is configured such that the cross-sectional area of free space between the housing or barrel and the conveying means or device decreases for example gradually decreases or decreases in a step-wise fashion in a direction from or between the inlet and the outlet.

The conveying means or device may comprise an extruder screw. The extruder screw may comprise a shaft, for example which may have a first and a second end. A helical flight may be arranged about the shaft, e.g. and may extend between the first and second ends. The pitch and/or the depth of the flight may alter along the length of the shaft.

A further aspect of the invention provides a kit of parts comprising a housing or barrel and an extruder screw as described herein.

A yet further aspect of the invention provides a method of pyrolyzing biomass waste residue, the method comprising the steps of:
 a) heating biomass waste residue in order to partially pyrolyze the biomass waste residue; and
 b) increasing the pressure of the partially pyrolyzed biomass waste residue to thereby further pyrolyze the partially pyrolyzed biomass waste residue.

Increasing the pressure of the partially pyrolyzed biomass waste residue may comprise reducing the volume of the partially pyrolyzed biomass waste residue.

Step a) may comprise heating the biomass waste residue within a reactor, e.g. a pyrolysis reactor. Step a) may comprise heating the biomass waste residue within a substantially annular space. Step a) may comprise transferring heat to the biomass waste residue from a location surrounded by the biomass waste residue and/or from a location not surrounded by the biomass waste residue.

The method may comprise a step c) of moving or conveying the biomass waste residue and/or the partially pyrolyzed biomass waste residue (for example within the reactor). The step c) of moving or conveying may comprise moving the biomass waste residue and/or partially pyrolyzed biomass waste residue from a first area to a second area, where the volume of the second area is less than the volume of the first area.

The method may comprise a step d) of mixing phases of products of the partially pyrolyzed biomass waste residue, for example where step d) may occur simultaneously with or subsequent to step b). Mixing phases of products of the partially pyrolyzed biomass waste residue may comprise allowing or moving one phase of the product of the partially pyrolyzed biomass waste residue more rapidly than another phase of product of the partially pyrolyzed biomass waste residue.

The method may comprise a step e) of introducing the biomass waste residue to a pyrolysis reactor, where step e) may occur prior to steps a) and b).

The method may comprise a step f) of separating phases of products of the further pyrolyzed biomass waste residue, for example within the reactor (where the biomass waste residue is processed therewithin). Step f) may occur subsequent to step b) (and step d where this step occurs).

For the avoidance of doubt, any of the features described herein apply equally to any aspect of the invention.

Within the scope of this application it is expressly envisaged that the various aspects, embodiments, examples and alternatives set out in the preceding paragraphs, in the claims and/or in the following description and drawings, and in particular the individual features thereof, may be taken independently or in any combination. Features described in connection with one aspect or embodiment of the invention are applicable to all aspects or embodiments, unless such features are incompatible.

BRIEF DESCRIPTION OF THE DRAWINGS

Embodiments of the invention will now be described by way of example only with reference to the accompanying drawings in which:

FIG. 5' is an alternative embodiment of the pyrolysis reactor shown in FIG. 5;

FIG. 6' is an alternative embodiment of the pyrolysis reactor shown in FIG. 6;

DETAILED DESCRIPTION

Figure 1:
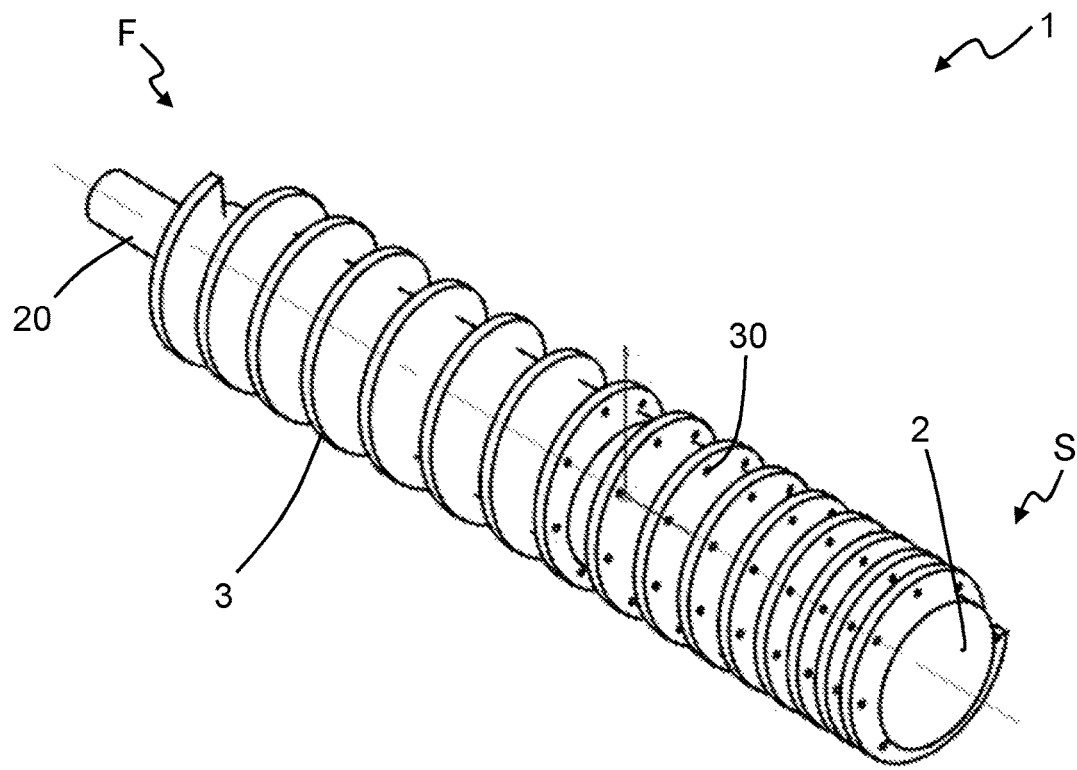
FIG. 1 is a perspective view of an extruder screw according to a first embodiment of the invention.
Figure 2:
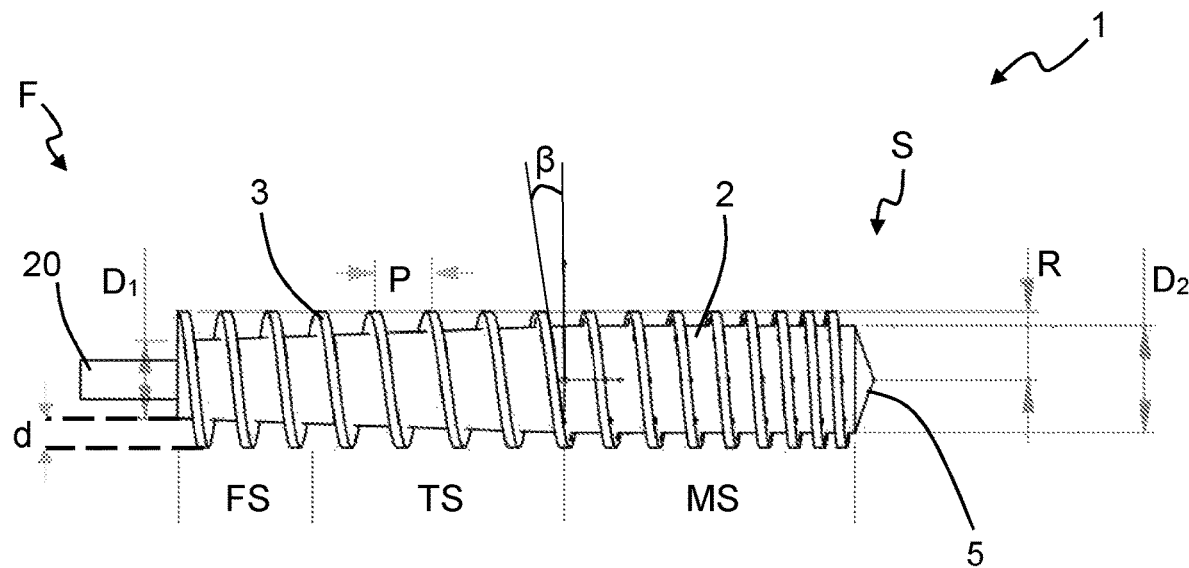
FIG. 2 is a side view of the extruder screw shown in FIG. 1.

Referring now to FIGS. 1 and 2, there is shown an extruder screw 1 according to a first embodiment of the invention, where the extruder screw 1 comprises a shaft 2 about which a helical flight 3 extends. The shaft 2 is formed of a thermally conductive material for conducting heat, in use, as will be described in greater detail below.

The shaft 2 has first end F and a second end S. The extruder screw 1 has three sections, first, second and third sections. In embodiments, the first end F is upstream and the second end S is downstream (in use). In embodiments, the first section is at and/or adjacent the first end F and comprises a feed section FS, the third section is at and/or adjacent the second end S and comprises a metering section MS, and the second section is between the first and third sections and comprises a transition section TS.

The shaft 2 is generally cylindrical and has a first diameter $D_1$ at the first end F and a second diameter $D_2$ at the second end S. The second diameter $D_2$ is greater than the first diameter $D_1$. The diameter of the shaft 2 remains substantially constant in the metering section MS. The diameter of the shaft 2 gradually increases from the first diameter $D_1$ to the second diameter $D_2$ in the feed section FS and in the transition section TS.

The shaft 2 has an at least partially hollow core within which is a heater, for example a high-speed self-recuperative burner (not shown) is installed.

The outer radius R of the flight 3 is constant along the length of the shaft 2. Accordingly, because the diameter of the shaft 2 alters along its length then so too does the depth d of the flight 3. The depth d of the flight 3 refers to the distance by which the flight 3 extends from the outer surface of the shaft 2 to the outer radius R of the flight 3. The depth d of the flight 3 decreases from the first end F toward the second end S of the shaft 2. The flight 3 may have a helix angle β which changes along its length.

The flight 3 has a pitch P, that being the longitudinal distance between successive helical turns of the flight 3.

The helix angle β varies in relation to the pitch P, i.e. the helix angle β of the flight 3 is relatively larger at sections wherein the pitch P is relatively greater, and vice versa.

The pitch P of the flight 3 alters along the length of the shaft 2. The pitch P adjacent the first end F of the shaft 2 is greater than is the pitch adjacent the second end S of the shaft 2. In the feed section FS and the transition section TS the pitch P of the flight 3 remains substantially constant along the length of the shaft 2.

In contrast to the transition section TS, which has a substantially constant pitch P, the pitch P in the metering section MS gradually reduces in the downstream direction, i.e. from the transition section TS toward the second end S of the shaft 2. Advantageously, the reduction in pitch P of the flight 3 in the metering section MS provides an increased surface area for the biomass to contact the flight 3, which in turn increases the heat transfer in the metering section MS.

A securement member 20 extends from the first end F of the shaft 2. The securement member 20 is adapted to be secured, in use, to a prime mover (not shown) suitable for providing rotational motive force or to a gear (not shown) or other intermediary element suitable for transferring rotational force from a prime mover. The second end S of the shaft 2 comprises a conical extension 5 co-aligned with the longitudinal axis of the shaft 2.

Figure 3:
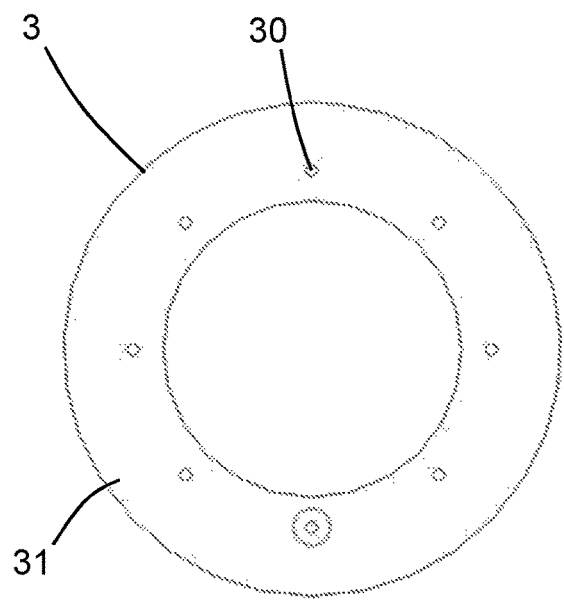
FIG. 3 is an end view of a flight of the extruder screw shown in FIG. 1.
Figure 4:
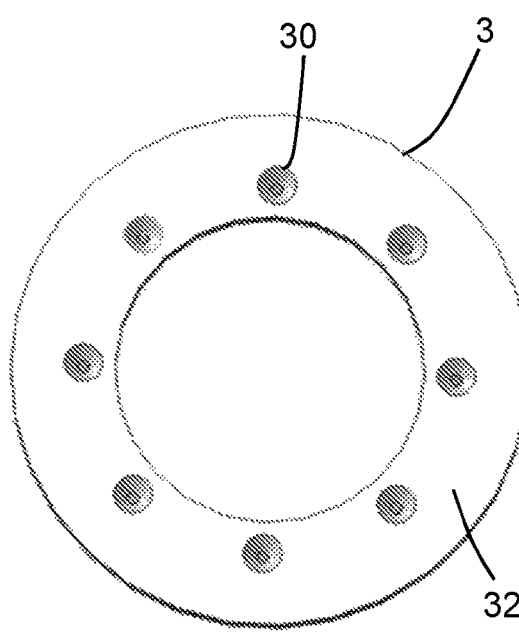
FIG. 4 is an end view of the obverse face of the flight of the extruder screw shown in FIG. 3.

In the metering section MS the flight 3 comprises plural apertures through its thickness. The apertures 30 are evenly spaced around the shaft 2 and at a substantially consistent distance from the outer surface thereof. As shown more clearly in FIGS. 3 and 4, each aperture 30 has a first area on a first, upstream face 31 of a turn of the flight 3 and second area on a second, downstream face 32 of the turn of the flight 3. The second area is greater than is the first area. Each aperture 30 tapers from the first area to the second area, for example in the downstream direction.

Figure 5:
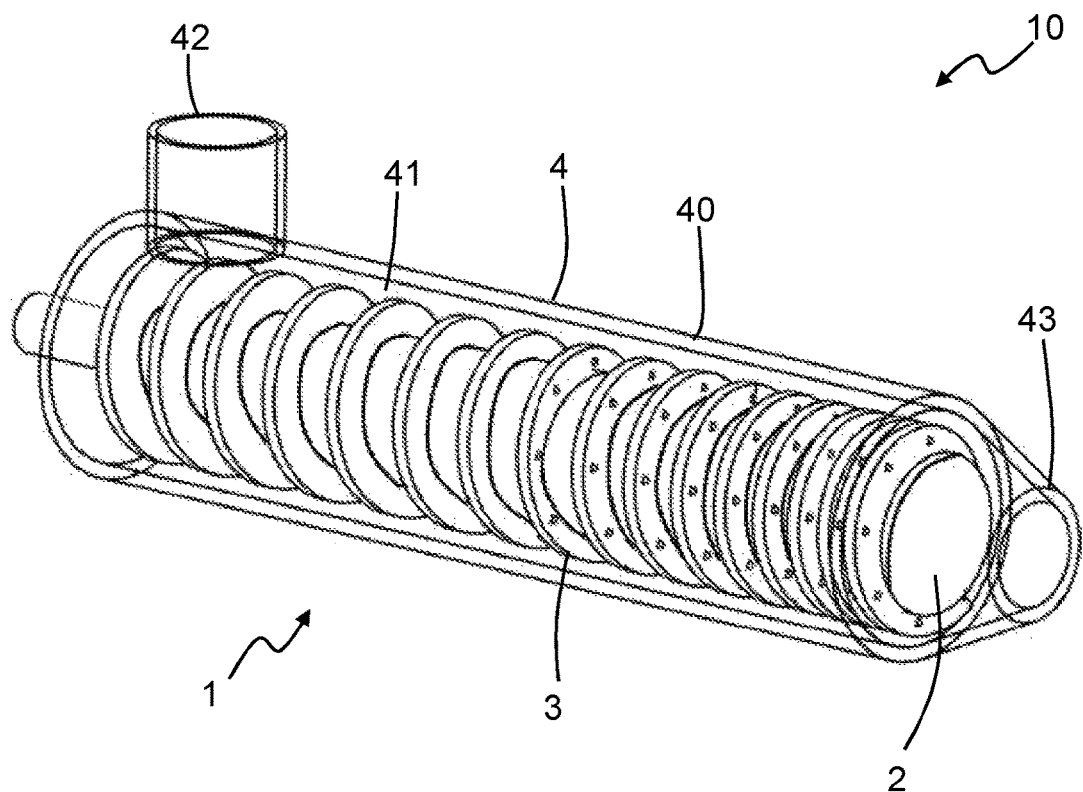
FIG. 5 is a perspective view of a pyrolysis reactor comprising the extruder screw shown in FIG. 1.
Figure 6:
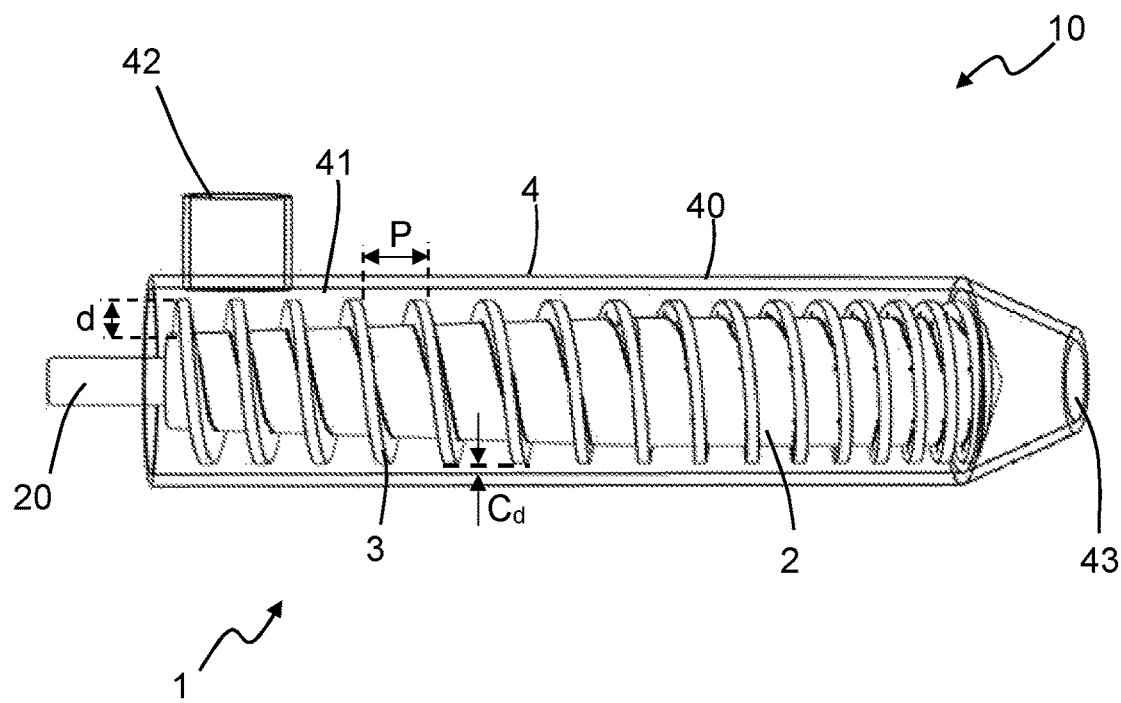
FIG. 6 is a side view of the pyrolysis reactor shown in FIG. 5.
Figure 5:
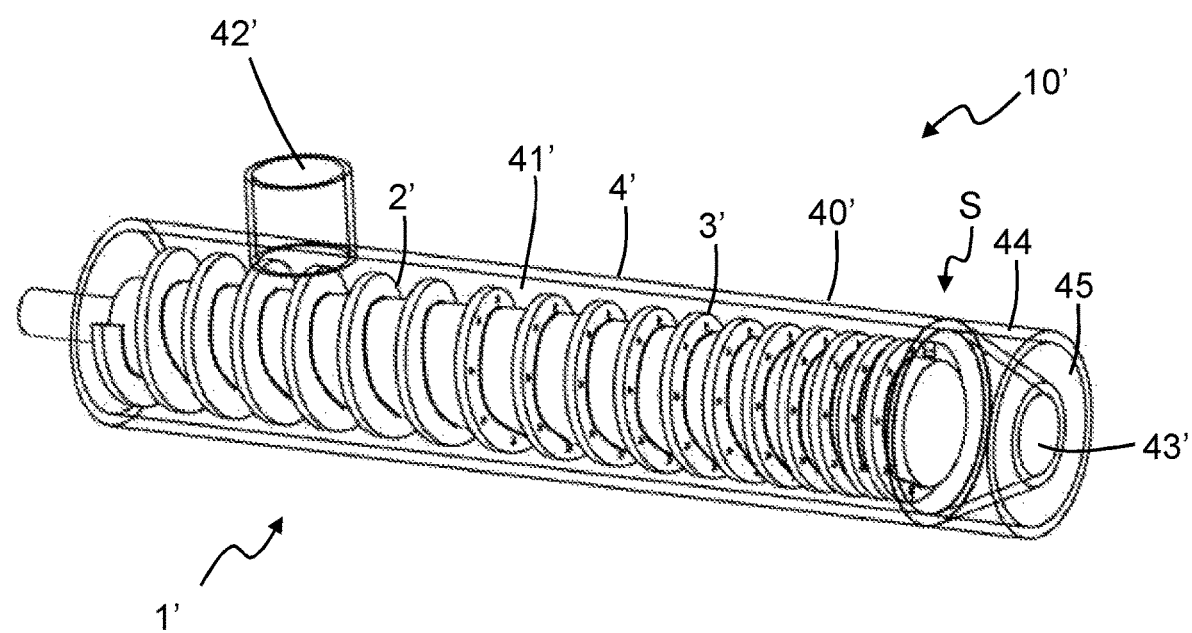
Figure 6:
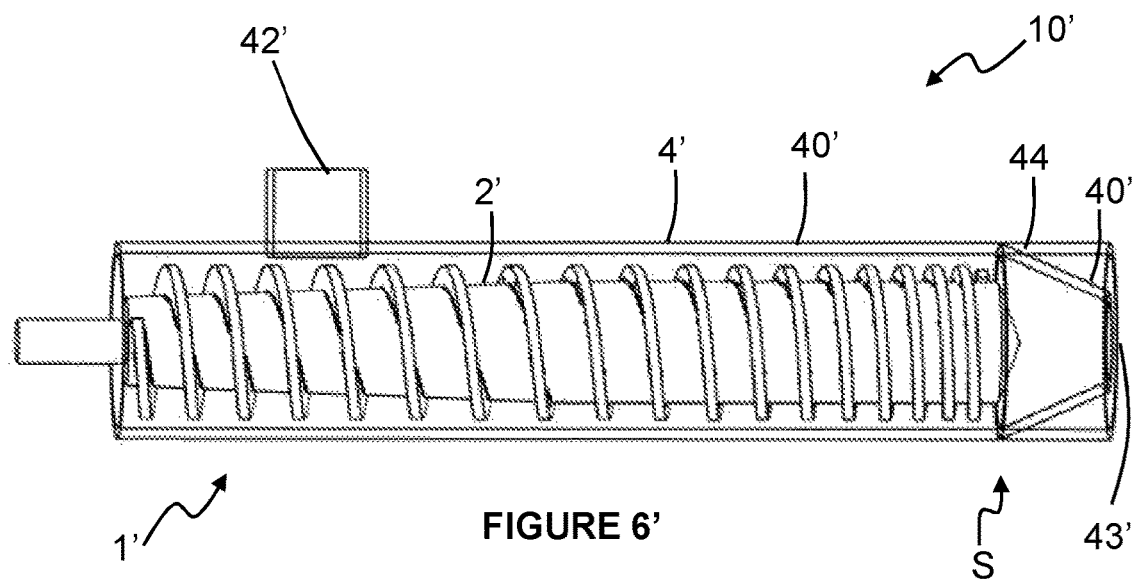

Referring now to FIGS. 5 and 6, there is shown a pyrolysis reactor 10 comprising a barrel 4 within which is the extruder screw 1 shown in FIGS. 1 and 2.

The barrel 4 has a generally cylindrical shape and is shaped and sized to closely surround the extruder screw 1. The barrel 4 has a barrel wall 40 which is formed from a thermally conductive material. The barrel 4 is heated, in use, as will be described below in greater detail.

A pyrolysis chamber 41 is defined within the barrel 4. The extruder screw 1 is located within the pyrolysis chamber 41. The barrel wall 40 extends along the length of the shaft 2 (when the extruder screw 1 is within the barrel 4). A clearance distance $C_d$ is defined between the outer edge of the flight 3 and the inner surface of the barrel wall 40. The clearance distance $C_d$ is substantially constant along the length of the shaft 2.

The barrel 4 has an inlet 42 adjacent the feed section FS of the extruder screw 1 and an outlet 43 adjacent the second end S of the shaft 2. The outlet 43 is co-axial with the longitudinal axis of the shaft 2. The outlet 43 is reduced in area relative to the diameter of the barrel 4, thereby forming a nozzle downstream of the second end S of the shaft 2.

Referring also to FIGS. 5' and 6', there is shown a further embodiment of a pyrolysis reactor 10' according to the invention, wherein like references are designated with a prime (') and refer to like components which will not be described further. The barrel 4' further comprises an outer wall 44 and a region 45. The outer wall 44 circumferentially extends around, and covers (at least in part) the barrel wall 40' to longitudinally extend towards or beyond the outlet 43' of the barrel 4'. In this embodiment, the outer wall 44 begins at the downstream, second end S' of the shaft 2' and terminates at the edge of the barrel wall 40' at the outlet 43'. The outer wall 44 is co-axial with the barrel wall 40' and the shaft 2', and is cylindrical, so has a substantially constant diameter. In this embodiment, the outlet 43' is a nozzle and so the outlet 43' has a relatively reduced diameter in comparison to the outer wall 44.

The region 45 is represented schematically as a void. However, the outer wall 44 and the region 45 may be formed from any suitable material, e.g. a thermally conductive material such as metal, and may comprise a solid wall that is continuous with the barrel wall 40', i.e. in embodiments of the pyrolysis reactor 10', the region 45 comprises solid metal, and therefore there is no void between the outer wall 44 and the barrel wall 40' surrounding the outlet 43'.

Advantageously, the thickness of the outer wall 44 and the barrel wall 40', particularly surrounding the outlet 43', provides additional mechanical strength to ensure that the barrel wall 40' does not buckle under the high pressures experienced in the metering section MS of the extruder screw 1', wherein the biomass is subjected to high operating temperatures during the final compressive stages of pyrolysis.

More advantageously, the pressure exerted by the compressed biomass on the barrel wall 40, 40' is proportional to the effectiveness of the pyrolysis action. Hence, higher ablative pressure in the metering section, wherein the biomass is highly compressed, will reduce the external heating requirement in that section or zone.

The extruder screw 1 is attached (either directly or indirectly) to a motor or other prime mover (not shown) prior to use of the pyrolysis reactor 10, 10'. The high-speed self-recuperative burner within the shaft 2, 2' is activated to thereby heat the shaft 2, 2'. The barrel wall 40, 40' of the barrel 4, 4' is also heated by an external heat source (not shown). The pyrolysis reactor 10, 10' is operated at a temperature of between 200° C. and 900° C., dependent on the substance to be pyrolyzed, the products of pyrolysis required and the desired speed and/or efficiency of pyrolysis.

In use, biomass waste residue is fed through the inlet 42, 42' into the pyrolysis chamber 41, 41' within the barrel 4, 4'. The motor or other prime mover is activated to cause the extruder screw 1 to rotate relative to the barrel 4, 4'. As the extruder screw 1 rotates the helix angle of the flight 3, 3' causes the introduced biomass waste residue to be conveyed along the reactor 10, 10' from the feed section FS toward the outlet 43, 43'.

Thermal energy is transferred from the heated barrel wall 40, 40' and from the heated shaft 2, 2' to the biomass waste residue within the pyrolysis chamber 41, 41'. This transfer of heat causes pyrolysis of the biomass waste residue and converts it into vapour and biochar.

The helix angle β of the flight 3, 3' causes, due to rotation of the extruder screw 1 conveyance of the biomass waste residue and its converted products from the inlet 42, 42' to the outlet 43, 43'. A mix of phases of products of pyrolysis of the biomass waste residue is ejected from the outlet 43, 43' of the reactor 10, 10'. This mix of phases of products is then separated in a further downstream process (not shown).

Having a reduced pitch P and depth d of the flight 3, 3' adjacent the second end S of the shaft 2, 2' (while maintaining the clearance distance Cd) increases the concentration of low-molecular weight non-condensable fuel gas products in the vapour ejected from the reactor 10, 10' at the outlet 43, 43'.

Without wishing to be bound by any particular theory, it is believed that reduction of the pitch P and depth d of the flight 3, 3' reduces the volume between turns of the flight 3, 3' through which the biomass waste residue must be travel. By reducing the volume, the pressure is consequently increased which results in an increase in the heating rate, i.e. the thermal transfer efficiency of the biomass waste residue at this location within the reactor 10, 10'. Moreover, a reduction in the volume relatively increases the ratio between the volume of biomass waste residue and the surface area of the active surfaces of the reactor (e.g. the inner surface of the barrel wall 40, 40' and the shaft 2, 2' and flight 3, 3' outer surface) in this part of the reactor 10. Accordingly, the transfer of thermal energy to, and the heating rate of, the biomass waste residue is relatively enhanced within this part of the reactor 10 and, therefore, a relatively increased concentration of low-molecular weight non-condensable fuel gases is generated.

Moreover, as the mass is conveyed from the inlet toward the outlet, pyrolysis will gradually occur, such that a mass nearer to the outlet will have a relatively greater concentration of pyrolysis products than does a mass nearer to the inlet, i.e. the rate of pyrolysis will increase as the mass is conveyed from the inlet towards the outlet. The rate of pyrolysis is dependent upon the residence time of the mass within the reactor. Furthermore, the mass of the particles of pyrolysis relatively decrease in size along the length of the reactor 10, in the downstream direction. The products of pyrolysis of biomass waste residue comprise both vapours and solids. Accordingly, in use, there will be a relatively higher concentration of vapours toward the outlet than there are adjacent the inlet. Relatively increasing the pressure of the mass in the metering section is believed to enhance mixing of the different phases of formed products, thereby increasing the catalytic reactions therebetween. In this way additional vapour cracking occurs, resulting in the formation of a relatively increased quantity of low-molecular weight fuel products.

Furthermore, by reducing the volume between adjacent turns of the flight 3, 3' and consequently increasing the pressure of biomass waste residues therebetween a more constant pressure of said biomass waste residue against the adjacent inner surface of the barrel wall 40, 40' as well as the adjacent outer surface of the shaft 2, 2' and the adjacent flight 3, 3' surfaces is produced. This results in an increased ablative action of the biomass. This is particularly advantageous in the metering section MS of the extruder screw 1 because the biomass particle size is relatively reduced (due to pyrolysis) by the time the biomass waste residue is conveyed to this section of the extruder screw 1. Relatively smaller particles occupy less volume when compressed together than do relatively larger particles and, accordingly, reducing the working volume ensures a constant pressure of said particles of reduced size against the working surfaces of the pyrolysis reactor 10. In addition, the reduction in particle size affects the heat transfer coefficient of the biomass, which in turn affects the mechanism of pyrolysis.

By reducing the distance between the outer surface of the shaft 2, 2' and the inner surface of the barrel wall 40, 40' the distance by which biomass passing therethrough is able to travel relative to the barrel wall 40, 40'. Accordingly, heat transfer across biomass waste residue from the barrel wall 40, 40' to the shaft 2, 2' is relatively enhanced because the thermal energy has a relatively reduced distance to travel and accordingly experiences reduced losses. In this way the temperature distribution profile across the space between the inner surface of the barrel wall 40, 40' to the outer surface of the shaft 2, 2' is made relatively more uniform in the metering section MS than is the case in the feed section FS or the transition section TS.

Advantageously, the relatively enhanced concentrations of low-molecular weight fuel gas products generated by the above-described apparatus and method do not require the use of relatively higher input temperatures. Accordingly, the barrel 4, 4' of the reactor 10, 10' and the extruder screw 1, 1' do not need to be formed from more expensive materials or be constructed in a more expensive manner. The above-described apparatus and method thereby result in relative cost savings.

By heating both the shaft 2, 2' and the barrel wall 40, 40' of the barrel 4, 4' the temperature distribution profile between the inner surface of the barrel wall 40 and the outer surface of the shaft 2, 2' may be relatively improved. Heating of the shaft 2, 2' allows heat to be transferred to the biomass waste residue from the shaft 2, 2' and the flight 3, 3' in addition to the barrel wall 40, 40'. The active surface area for pyrolysis within the reactor 10, 10' is thereby relatively increased and the efficiency of pyrolysis is accordingly relatively enhanced.

The apertures 30 through the flight 3, 3' advantageously allow passage of vapour from the first, upstream face 31 of a turn of a flight 3 to the second, downstream face 32 of the turn of the flight 3. This increased mobility of the vapour within the reactor 10, 10' allows for enhanced mixing of the phases of products of pyrolysis within the reactor 10, 10'. Moreover, provision of the apertures 30 mitigates against the build-up of excessive vapour pressures between adjacent turns of the flight 3, 3'. The tapered shape of the apertures 30 (increasing in size in the downstream direction) accelerates vapour passing therethrough due to expansion of the vapour through each aperture 30, i.e. according to the Venturi effect, wherein the velocity of the vapour increases as it passes through the constricted volume of the apertures 30 of the upstream face 31 in the downstream direction towards the downstream face 32. Accordingly, mixing of vapour with the other product phases is relatively enhanced due to the relatively increased velocity of the vapour. Furthermore, relatively increasing the velocity of the vapour from the apertures 30 reduces the possibility of blockage of the apertures 30 (for example by biochar or other products).

Advantageously, by separating the phases of the products downstream of the reactor 10, 10' the phases of the products are able to be relatively more completely mixed within the reactor 10, 10'. Due to this relatively enhanced mixing of the phases of the products further thermal cracking of the products is relatively increased. Accordingly, the characteristics of the mixture leaving the outlet 43, 43' of the reactor 10, 10' can be more readily controlled.

Beneficially, the apparatus according to the invention is readily scalable and can therefore be used for pyrolysis of biomass waste residues in laboratory bench tests at feed rates of 1 kg/hr up to industrial scale processing at feed rates of, for example, 10,000 kg/hr. Moreover, the apparatus according to the invention is suitable for processing biomass waste residue with a moisture content of up to 30% and/or having particle sizes having a maximum diameter ranging from 2 mm to 100 mm.

Figure 7:
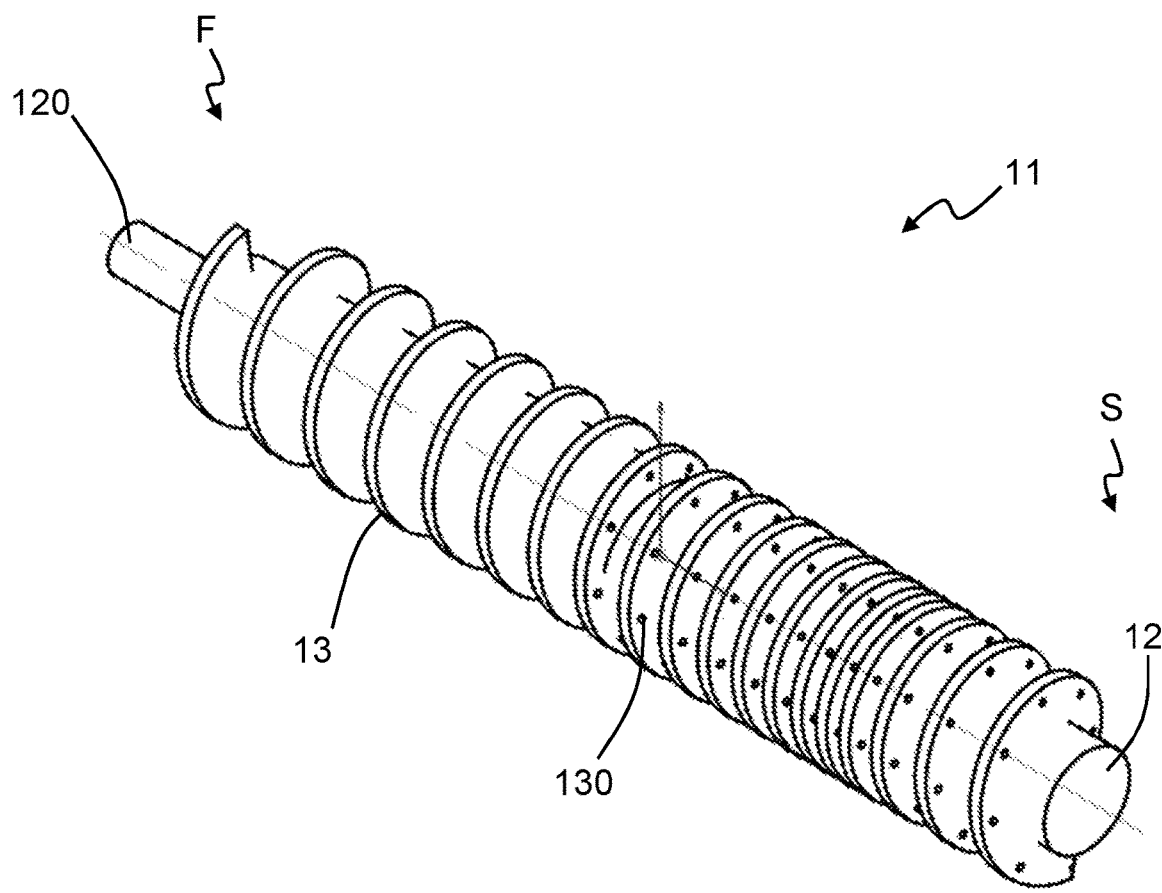
FIG. 7 is a perspective view of an extruder screw according to a further embodiment of the invention.
Figure 8:
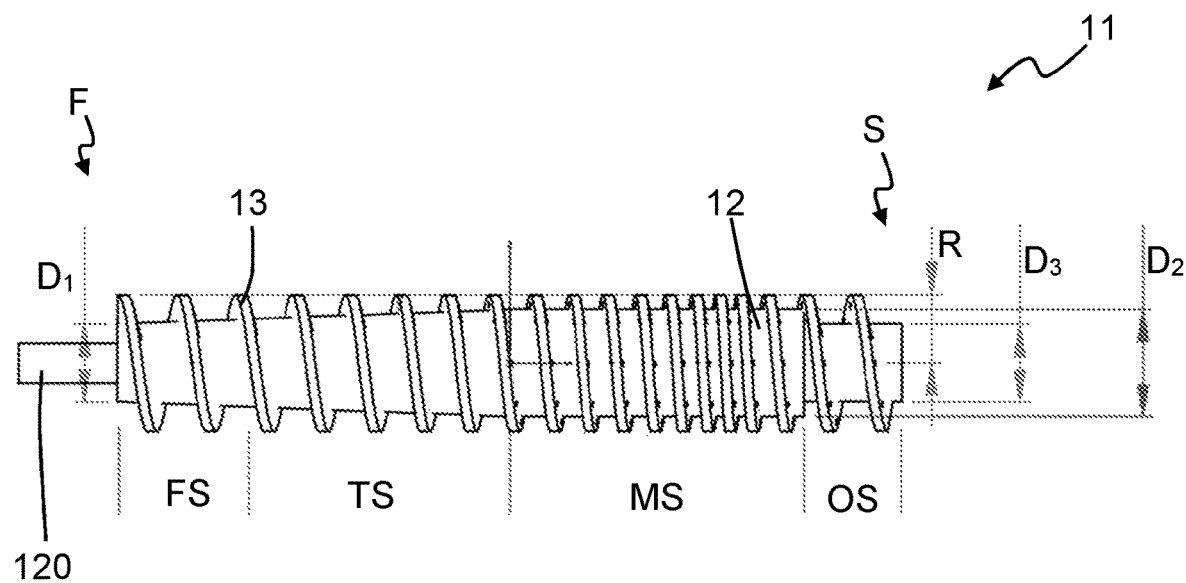
FIG. 8 is a side view of the extruder screw shown in FIG. 7.

Referring now to FIGS. 7 and 8 there is shown an extruder screw 11 according to a further embodiment of the invention, wherein like features to those of the extruder screw 1 shown in FIGS. 1 and 2 are depicted by like references preceded by a '1', and will not be described further herein. The extruder screw 11 shown in FIGS. 7 and 8 differs from that shown in FIGS. 1 and 2 in that the extruder screw 11 has a fourth section, an outlet section OS, downstream of the metering section MS. Furthermore, the shaft 12 is not heated, in use, and accordingly need not be formed from a thermally conductive material (though it may be, in any event). The shaft 12 does not, therefore, have a partially hollow core within which a high-speed self-recuperative burner is installed.

The diameter $D_3$ of the shaft 2 in the outlet section OS is the same as the diameter $D_1$ of the shaft 2 at the first end F of the shaft 2. Accordingly, the diameter $D_3$ of the shaft 2 in the outlet section OS is less than the diameter $D_2$ of the shaft 2 in the metering section MS. The outer radius of the flight is the same in the outlet section OS as it is in the other sections of the extruder screw 11. Accordingly, the depth di of the flight is relatively greater in the outlet section OS than it is in the metering section MS. Furthermore, the pitch $P_1$ of the flight 3 is greater in the outlet section OS than it is in the metering section MS. In particular, the pitch P of the flight 3 is greater in the outlet section OS than is the pitch P of the flight toward the downstream end of the metering section MS.

Figure 9:
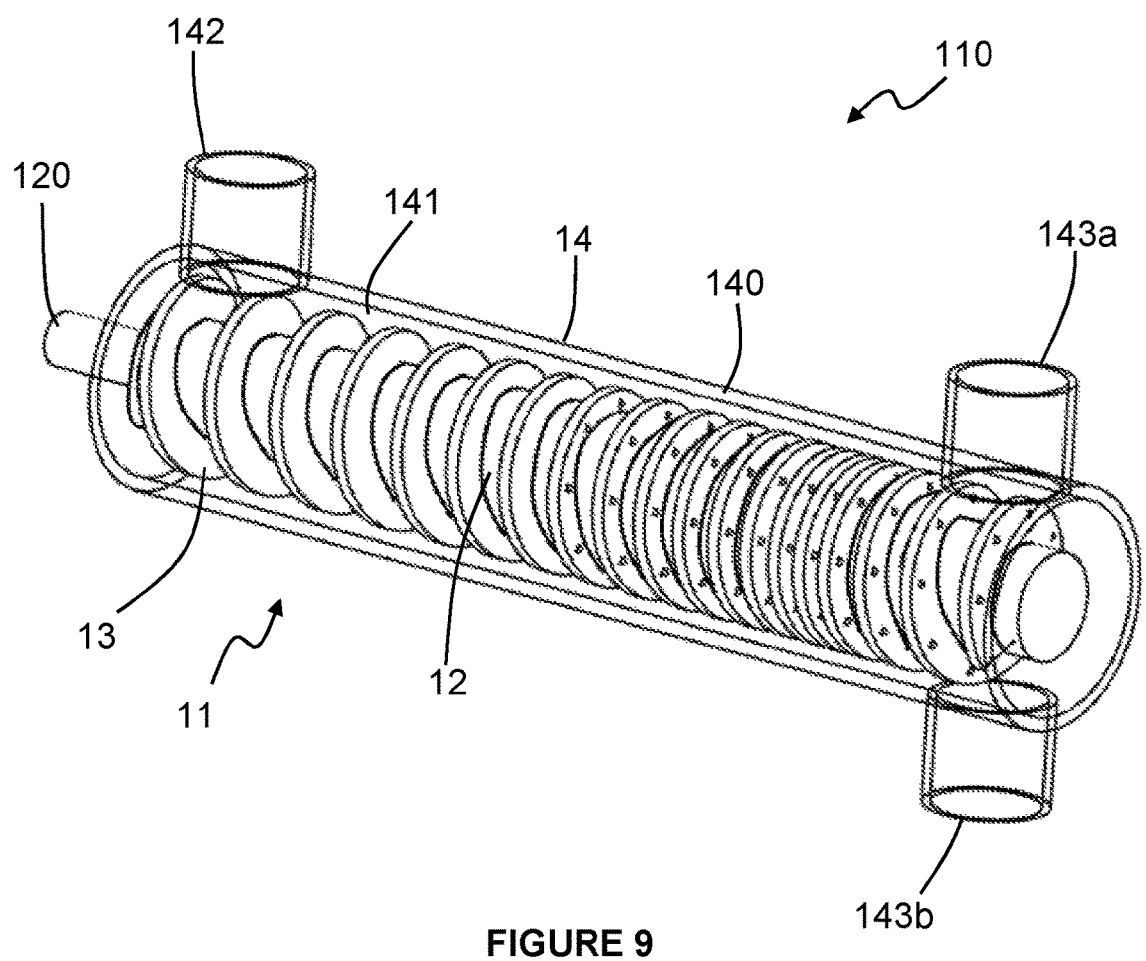
FIG. 9 is a perspective view of a pyrolysis reactor comprising the extruder screw shown in FIG. 7.
Figure 10:
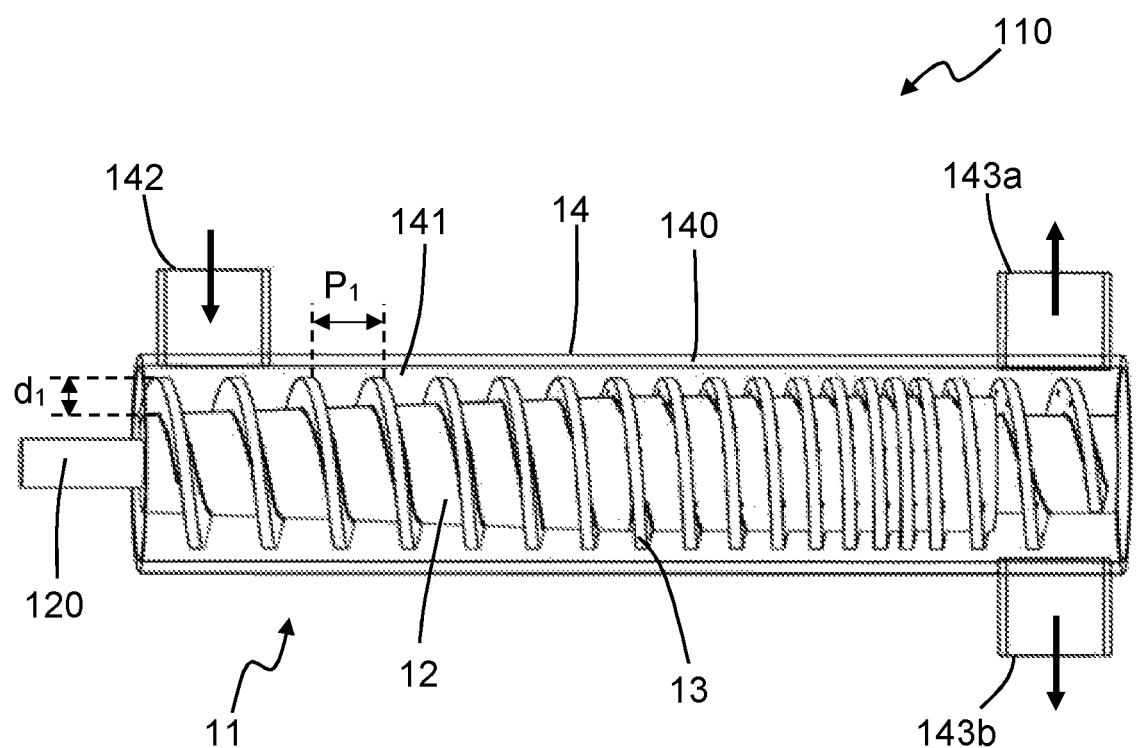
FIG. 10 is a side view of the pyrolysis reactor shown in FIG. 9.

Referring now to FIGS. 9 and 10, there is shown a pyrolysis reactor 110 according to a further embodiment of the invention, wherein like features to those shown in the pyrolysis reactor 10 shown in FIGS. 5 and 6 are denoted by like references preceded by a '1', which will not be described herein further. The pyrolysis reactor 110 shown in FIGS. 9 and 10 comprises an barrel 14 within which is the extruder screw 11 shown in FIGS. 7 and 8. The barrel 14 of the rector 110 differs from the barrel 4 shown in FIGS. 5 and 6 in that there are two outlets (first outlet 143*a* and second outlet 143*b*) instead of a single outlet 43, and the outlets 143*a*, 143*b* are not co-axial with the extruder screw 11. Instead, the first and second outlets 143*a*, 143*b* extend in directions substantially perpendicular to the longitudinal axis of the extruder screw 11.

The first and second outlets 143*a*, 143*b* are located adjacent to the outlet section OS of the extruder screw 11. In use, the pyrolysis reactor 110 is arranged so that the first outlet 143*a* is uppermost and the second outlet 143*b* is lowermost (e.g. the first outlet 143*a* is relatively above the second outlet 143*b*).

In use, pyrolysis of biomass waste residue within pyrolysis reactor 110 occurs as described above in respect of the pyrolysis reactor 10, with two differences: firstly the shaft 12 is not heated, and secondly the products of pyrolysis are separated before they exit the pyrolysis reactor 110.

With the pyrolysis rector 110 shown in FIGS. 9 and 10, however, the mixed phases of products of pyrolysis leaving the metering section MS expand and separate within outlet section OS. Vapour products egress from the barrel via the first outlet 143*a* whilst solid (and/or liquid) products egress from the barrel via the second outlet 143*b*. In this way the products leaving the reactor may be more closely controlled. Moreover, the products of pyrolysis may be more rapidly and easily stored or otherwise used after they have left the pyrolysis reactor 110.

Figure 11A:
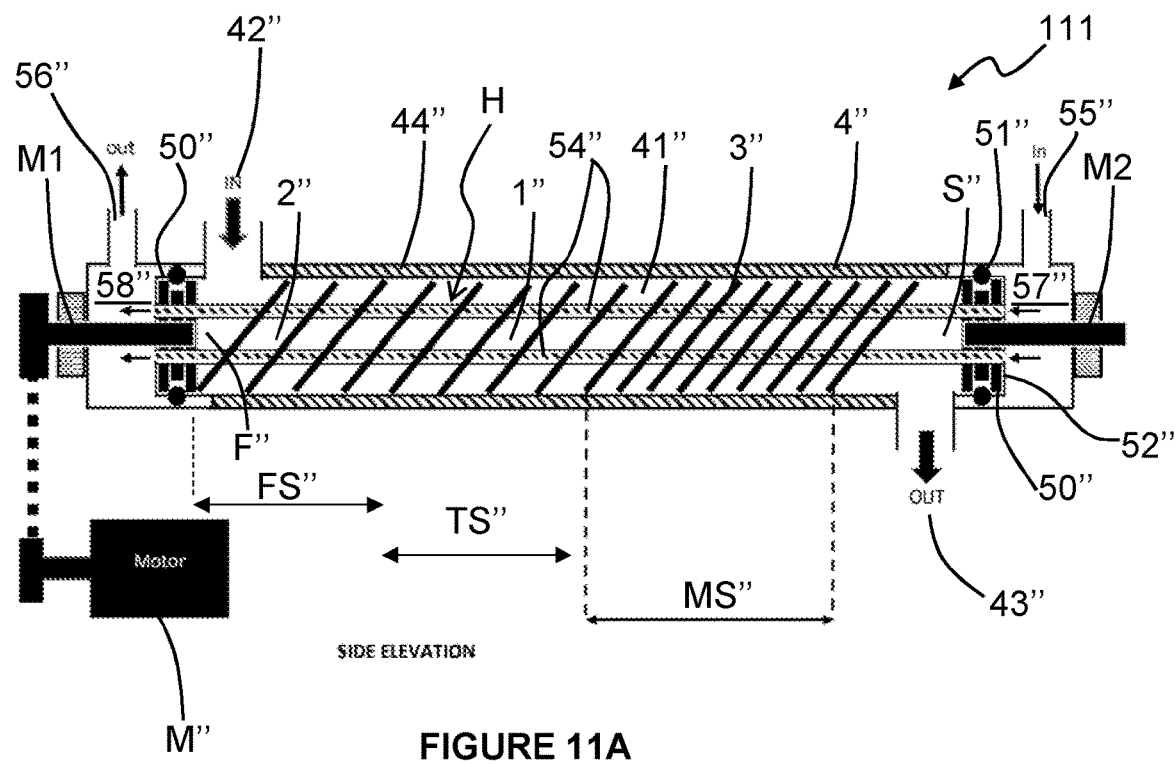
FIGS. 11A to 11C is a pyrolysis reactor comprising a screw according to a further embodiment of the invention.
Figure 11B:
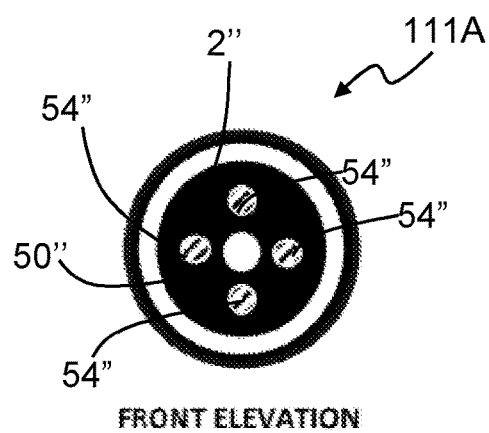
Figure 11C:
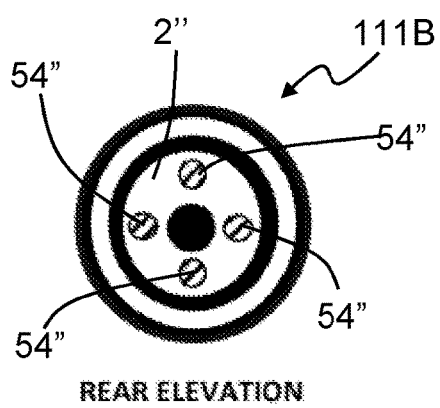

Referring now to FIGS. 11A to 11C, there is shown a pyrolysis reactor 111 according to a further embodiment of the invention, wherein like references to those previously described are designated with a double prime". The pyrolysis reactor 111 has similar features to those described in FIGS. 5, 6, and 5', and 6'. In this embodiment, the shaft 2" of the screw 1" has a constant diameter along its length, although it should be noted that the diameter of the shaft 2" and/or the depth of the flight 3" may vary along the length of the shaft 2" in alternative embodiments.

Referring first to FIG. 11A, there is shown a side view of the pyrolysis reactor 111 comprising a barrel 4" and a screw 1".

The barrel 4" comprises an outer wall 44" and is shaped and sized to closely surround the screw 1". The barrel 4" defines a pyrolysis chamber 41" in which is located the screw 1".

The screw 1" comprises a shaft 2" (preferably a centreless shaft) with a first end F" and a second end 5". The shaft 2" comprises a flight 3". The flight 3" and/or the reactor 111 comprises a feed section FS", a transition section TS" and a metering section MS". In this embodiment the pitch of the flight 3" is the same in the feed section FS" and transition section TS".

The shaft 2" is mounted for rotation within the barrel 4" on mounts 50" which are configured to allow rotation of the shaft 2" and are provided with seals 51" disposed about a mounting plate 52" for retaining heating tubes H.

The barrel 4" comprises an inlet 42" for receiving material to be pyrolosed (for example biomass) adjacent the first end F" and an outlet 43" adjacent the second end S" of the shaft 2". The inlet 42" and the outlet 43" are both positioned perpendicular to the longitudinal axis of the shaft 2".

The pyrolysis reactor 111 further comprises a motor M" for rotation of the shaft 2" within the barrel 4".

Referring also to FIGS. 11B and 11C, there is shown a front elevation 111A and the rear elevation 111B of the shaft 2" of the screw 1". There is shown a heater H within the shaft 2". In this embodiment, the heater 2" is provided as hollow heater tubes located 54" within a single or individual recesses of the shaft 2".

The heater H is mounted for rotation at a first mount M1 and a second mount M2. The inlet 42" and outlet 43" are each located inboard of the first mount M1 and the second mount M2.

In use, biomass waste residue is fed through the inlet 42" into the pyrolysis chamber 41" within the barrel 4". The motor M" is activated to cause the screw 1" and the heater H to rotate relative to the barrel 4"'. As the screw 1" rotates the helix angle of the flight 3" causes the introduced biomass waste residue to be conveyed along the pyrolysis reactor 111 from the feed section FS" toward the outlet 43".

Thermal energy is transferred from the heater H to the biomass waste residue within the pyrolysis chamber 41". This transfer of heat causes pyrolysis of the biomass waste residue and converts it into vapour and biochar. The helix angle of the flight 3" causes, due to rotation of the screw 1" conveyance of the biomass waste residue and its converted products from the inlet 42" to the outlet 43". A mix of phases of products of pyrolysis of the biomass waste residue is ejected from the outlet 43" of the reactor 111. This mix of phases of products is then separated in a further downstream process (not shown).

Advantageously, provision of an internal heater H within the shaft 2" of the screw 1" such that it is rotatable within the barrel 4" enables greater heat transfer to the biomass waste, and hence the pyrolysis reaction is more efficient.

The barrel may also be externally heated to further improve heat transfer to the biomass or other material.

Advantageously, the pyrolysis process may be used to generate syngas. Some of the syngas may be used to generate heat which can be supplied to the heat inlet 55" and along the heater tubes 54" of the heater H to the outlet 56". The heat inlet 5" is in communication with a manifold 57" which is separated from the pyrolysis reaction zone by the seals 51" and plate 52". There is further provided an outlet manifold 58" in communication with the heat outlet 56".

In use, heat (heated gas) flows from the heat inlet 55" to the heat outlet 56" via the hollow tubes 54" to heat biomass or other material within the reactor.

It is possible to use other heaters H, for example resistively heated tubes, inductively heated tubes, radiant heat elements and so on but the use of heated fluid has proven to be the most efficacious.

It will be appreciated by those skilled in the art that several variations to the aforementioned embodiments are envisaged without departing from the scope of the invention. For example, the extruder screw 1, 11 may comprise more than one flight 3, 3', 13.

The heater within the shaft 2, 2', 12 of the screw, e.g. extruder screw 1, 11, and/or the external heat source of the barrel 4, 4', 14 may comprise several heaters that may be separately controllable to heat a respective region of the shaft and/or barrel to a specific temperature or temperature range. For example, the feed section FS, the transition section TS, the metering section MS, and/or the outlet section OS may each comprise a different heater, which each heat to a different temperature, e.g. each heater provides a progressively higher temperature to each section or zone, going from the feed section FS, through the transition section TS, the metering section MS, and finally to the outlet section OS. The difference in temperature experienced within each section may comprise a step change in temperature. For example, the feed section FS may be provided with a heater in the shaft 2, 2', 12 and/or an external heat source to the barrel 4, 4', 14, which heats to a temperature of, for example, approximately 200° C. to begin the process of pyrolysis. The transition section TS may be provided with a separate heater that heats to a temperature of, for example, 500° C. The metering section MS may be provided with a further heater that heats the biomass to a temperature of, for example, between 600 to 750° C. Alternatively, the temperature change experienced as the biomass progresses along the extruder screw 1, 11 may be gradual, e.g. the temperature may gradually increase from the feed section FS to the metering section MS and/or the outlet section OS.

The shape and structure of the outlet 43, 43' may influence the temperature at which the biomass may be heated at the final stages of pyrolysis. For example, if the outlet 43, 43' comprises a conical, tapered end, then the temperature at which the biomass may be heated in the metering section MS and/or outlet section OS is higher than if the outlet is a cylinder with a continuous diameter, which is coaxial with the extruder screw 1, 1' 11.

It will also be appreciated by those skilled in the art that any number of combinations of the aforementioned features and/or those shown in the appended drawings provide clear advantages over the prior art and are therefore within the scope of the invention described herein.

What is claimed is:

1. A pyrolysis reactor having an inlet for biomass waste material and an outlet for products, the reactor comprising a screw for conveying biomass waste material from the inlet to the outlet, the screw comprising a shaft with a first end and a second end adjacent the outlet and a helical flight arranged about the shaft and extending between the first and second ends, wherein the pitch of the flight alters between the first and second ends of the shaft, the diameter of the shaft increases along its length towards the outlet and the depth of the flight decreases in the direction from the inlet towards the outlet, the screw having a heater extending from the first end to the second end.

2. A pyrolysis reactor according to claim 1, wherein the pitch of the flight decreases along at least part of the length of the shaft.

3. A pyrolysis reactor according to claim 1, wherein the outer diameter of the flight is substantially constant along the length of the shaft.

4. A pyrolysis reactor according to claim 1, wherein the helix angle of the flight varies in correspondence to increase or decrease of the pitch of the flight along the length of the shaft.

5. A pyrolysis reactor according to claim 1, wherein the shaft comprises one or more recesses.

6. A pyrolysis reactor according to claim 1, wherein the screw and/or the shaft further comprises at least one of a feed section, a transition section and a metering section.

7. A pyrolysis reactor according to claim 6, wherein:
    (a) the feed section is at and/or adjacent the first end of the screw and/or the shaft,
    (b) the metering section is at and/or adjacent the second end of the screw and/or the shaft, and/or
    (c) the transition section is between the feed section and the metering section.

8. A pyrolysis reactor according to claim 6, wherein the pitch of the flight for at least one of the turns is less in the metering section than in the feed section and/or in the transition section.

9. A pyrolysis reactor according to claim 6, wherein the screw and/or the shaft further comprises an outlet section located in between the metering section and the second end, and wherein the shaft of the outlet section may have a reduced diameter with respect to the diameter of the shaft in the metering section.

10. A pyrolysis reactor according to claim 8, wherein the pitch and/or the depth of the flight is greater at the outlet section of the screw than in the metering section.

11. A pyrolysis reactor according to claim 8, wherein the shaft of the outlet section further comprises a conical or tapered end.

12. A pyrolysis reactor according to claim 1, further comprising one or more apertures that extend through the flight.

13. A pyrolysis reactor according to claim 12, wherein one or more turns of the flight in the metering section comprises the one or more apertures.

14. A pyrolysis reactor according to claim 1, further comprising an engagement member configured to allow engagement between the shaft and an actuator for rotating the shaft.

15. A pyrolysis reactor according to claim 1, further comprising a housing or barrel, wherein said housing or barrel is sized and/or shaped to closely surround the screw.

16. A method of pyrolyzing biomass waste residue in a pyrolysis reactor, the reactor comprising a screw for conveying biomass waste residue from a first end of the screw to an outlet at a second end of the screw, the screw comprising a shaft with a first end and a second end adjacent the outlet and a helical flight arranged about the shaft and extending between the first and second ends, wherein the pitch of the flight alters between the first and second ends of the shaft, the diameter of the shaft increases along its length towards the outlet and the depth of the flight decreases in the direction from the inlet towards the outlet, the method comprising:
- a) heating biomass waste residue between the first and second ends of the screw in order to partially pyrolyze the biomass waste residue by heating the screw; and
- b) increasing the pressure of the partially pyrolyzed biomass waste residue to thereby further pyrolyze the partially pyrolyzed biomass waste residue.

17. A method of pyrolyzing biomass according to claim 16, further comprising moving or conveying the biomass waste residue and/or the partially pyrolyzed biomass waste residue.

18. A method of pyrolyzing biomass according to claim 16, further comprising mixing phases of products of the partially pyrolyzed biomass waste residue.

* * * * *